United States Patent [19]
Asai et al.

[11] Patent Number: 4,919,985
[45] Date of Patent: Apr. 24, 1990

[54] COATED STYRENE RESIN CONTAINER AND PROCESS FOR PRODUCTION THEREOF

[75] Inventors: Tamio Asai; Yoshitsugu Maruhashi, both of Yokohama, Japan

[73] Assignee: Toyo Seikan Kaisha, Ltd., Tokyo, Japan

[21] Appl. No.: 294,637

[22] PCT Filed: Jan. 21, 1988

[86] PCT No.: PCT/JP88/00041
§ 371 Date: Sep. 22, 1988
§ 102(e) Date: Sep. 22, 1988

[87] PCT Pub. No.: WO88/05409
PCT Pub. Date: Jul. 28, 1988

[30] Foreign Application Priority Data
Jan. 22, 1988 [JP] Japan .................................. 62-11243

[51] Int. Cl.$^5$ .......................... B65D 23/08; B05D 3/00
[52] U.S. Cl. .................................... 428/36.6; 215/1 C; 215/12.2; 427/316; 427/322; 428/518; 428/520

[58] Field of Search ...................... 428/36.6, 518, 520; 215/1 C, 12.2; 427/316, 322

[56] References Cited
U.S. PATENT DOCUMENTS

| 3,328,196 | 6/1967 | Sincock | 428/36.6 |
| 3,922,451 | 11/1975 | Anchutz et al. | 428/36.6 |
| 4,267,202 | 5/1981 | Nakayama et al. | 427/40 |
| 4,370,368 | 1/1983 | Hirata et al. | 428/36.6 |
| 4,393,106 | 7/1983 | Maruhashi et al. | 428/36.7 |
| 4,436,778 | 3/1984 | Dugal | 428/36.7 |

Primary Examiner—James Seidleck
Attorney, Agent, or Firm—Sughrue, Mion, Zinn, MacPeak & Seas

[57] ABSTRACT

A specific oxidation product layer is formed on the surface of a styrene resin container body, and via the oxidation product layer, a coated layer of a copolymer of vinylidene chloride, vinyl chloride and a (meth)acrylate is provided. This coated container has not only excellent gas-barrier property but also excellent peel resistance, particularly excellent peel resistance at low temperatures in the wet state.

6 Claims, 2 Drawing Sheets

COATED STYRENE RESIN CONTAINER AND PROCESS FOR PRODUCTION THEREOF

TECHNOLOGICAL FIELD

This invention relates to a coated styrene resin container, and a process for its production. More specifically, it relates to a container obtained by providing a coating of a vinylidene chloride resin, which has excellent adhesion in the wet state, on a container of a styrene resin without any particular need for providing an anchor coat layer, and to a process for its production.

PRIOR ART

An aqueous latex of a vinylidene chloride resin is widely used for forming a coated layer on various packaging materials because it can form a coating having excellent resistance to permeation to various gases such as oxygen and water vapor. It is used, for example, as an inside or outside coating of a biaxially stretched polyester container.

Styrene resin containers, on the other hand, are widely used as handy packaging containers because they are cheap and easy to form. However, the styrene resins are among those resins which have highest gas permeability, and have an unsatisfactory ability to preserve goods therein. It is desired therefore to eliminate this problem.

It is naturally conceivable to improve the gas permeability resistance of a styrene resin container by providing a coating of a vinylidene chloride resin on the surface of the styrene resin container. Unexpectedly, such coated containers have not yet appeared on the packaging market. This is presumably because it is extremely difficult to coat a latex of the vinylidene chloride resin on the surface of the styrene resin container, and even when this coating of the latex is effected forcibly, adhesion of the coating to the container is extremely low.

U.S. Pat. No. 3,329,196 describes that a polymer or a copolymer of an alkyl methacrylate is formed as an anchor coat layer on a stretched molded article of polystyrene and coating a latex of a vinylidene chloride resin on the anchor coat layer.

However, the above method requires extra operations of coating a resin solution for the anchor coat and drying the anchor coat layer in addition to the coating of the vinylidene chloride resin. Inevitably, the number of steps increases and the cost of production becomes very high. Furthermore, since the styrene resin is one of those resins which are most easily soluble in various organic solvents. Marked restrictions are imposed on organic solvents which are used in forming the anchor coat, and the organic solvents exert undesirable influences on the styrene resin molded articles or the working environment.

SUMMARY OF THE INVENTION

It is an object of this invention to provide a coated styrene resin container in which a coated layer of a vinylidene chloride resin is firmly bonded to a container body of a styrene resin without an anchor coat layer.

Another object of this invention is to provide a coated styrene resin container in which the vinylidene resin coated layer has excellent peeling resistance, particularly at low temperatures in the wet state.

Still another object of this invention is to provide a process which can produce the above coated styrene resin container efficiently in lesser process steps without adverse effects of organic solvents.

According to this invention, there is provided a coated styrene resin container comprising a container body composed of a styrene resin and applied to at least one surface of the container body, a coated layer of a vinylidene chloride resin, the vinylidene chloride resin coated layer being composed of a copolymer containing 96 to 70 mole % of vinylidene chloride units, 3 to 30 mole % of vinyl chloride units and 3 to 20% of lower alkyl acrylate or methacrylate units based on the three components, and the coated layer being intimately bonded to the container body via a layer of an oxidation product of the styrene resin.

According to this invention, there is also provided a process for producing a coated styrene resin container, which comprises subjecting at least one surface of a container body composed of a styrene resin to an oxidation treatment so that the area ratio of oxygen peaks to carbon peaks measured by X-ray photoelectron spectroscopy is in the range of from 0.15 to 0.32, coating an aqueous latex of a vinylidene chloride resin containing 96 to 70 mole % of vinylidene chloride units, 3 to 30 mole % of vinyl chloride units and 3 to 20% of lower alkyl acrylate or methacrylate units based on the three components on the oxidized surface of the container body, and drying the coated layer so formed.

DESCRIPTION OF PREFERRED EMBODIMENTS

Figure 1A:
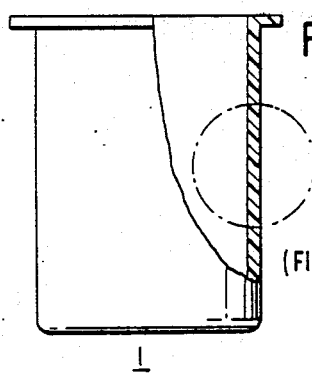
FIGS. 1A and 1B are sectional views showing the structure of the container in accordance with this invention.
Figure 1B:
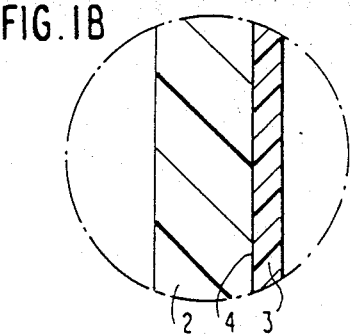

In FIGS. 1A and 1B showing the sectional structure of the coated styrene resin container of the invention, the container 1 is composed of a container body 2 formed of a styrene resin and a coated layer 3 of a vinylidene chloride resin. The coated layer 3 is firmly bonded via a layer 4 of an oxidation product of the styrene resin formed on the surface of the container body.

The present invention is based on the finding that by forming a layer of a oxidation product of the styrene resin on the surface of the container body and selecting a vinylidene chloride resin of a specific composition to be described, a latex of the vinylidene chloride resin can be coated on the styrene resin container without any particular need to provide an anchor coat layer, and the peel strength, particularly at low temperature in the wet state, of the coated layer with respect to the container body is makredly increased.

The coatability of a latex on a resin article and the adhesion of the resulting coating depends upon both the surface condition of the article and the properties of the resin constituting the latex. Since the styrene resin is water repellent and repels the aqueous latex, it is difficult to coat the latex on it. However, by forming an oxidation product layer on its surface in accordance with this invention, the latex can be coated and the peel strength of the coating with respect to the container is markedly increased. It is very important that with regard to these characteristics, the vinylidene chloride resin is composed of 98 to 60 mole %, especially 96 to 70 mole %, of vinylidene chloride units, 1 to 40 mole %, especially 3 to 30 mole %, of vinyl chloride units and 1 to 30 mole %, especially 3 to 30 mole %, of alkyl acrylate or methacrylate units, based on the three components. Among these polymer constitutents, the vinylidene chloride units dominate the gas permeation resistance of the coating, and the vinyl chloride units as a comonomer component lowers the glass transition point (Tg) of the resin and enhances its film formability at low temperatures. The lower alkyl acrylate or methacrylate units increases the adhesion of the coating to the styrene resin substrate. Thus, by using the vinylidene chloride resin of the above composition in the form of a latex, its excellent coatability (film formability) and excellent adhesion to the styrene resin container body can be obtained.

It is important that the mole ratios of the individual units of the vinylidene chloride resin used should be within the above ranges. If the proportion of the vinylidene chlorides units is lower than the specified limit, the gas-barrier property of the coating with respect to oxygen and water vapor is markedly deteriorated as compared with the case where it is within the specified range. If, on the other hand, it exceeds the limit specified above, the film formability of the resin at low temperatures and the adhesion of the coating tend to be reduced. Thus, proportions outside the specified range are undesirable. If the proportion of the vinyl chloride units is less than the above-specified limit, the film formability of the resin at low temperatures tends to be reduced and the resulting coating tends to become brittle. If, on the other hand, it exceeds the specified limit, the gas permeation resistance of the coating is unsatisfactory. Furthermore, if the proportion of the acrylate or methacrylate units is less than the specified range, there is a marked tendency toward reduction of the adhesion of the coating. If it is larger than the specified range, the gas permeation resistance of the coating is unsatisfactory.

In the present invention, the styrene resin constituting the container body is a thermoplastic resin derived mainly from styrene, and includes a homopolymer and copolymers of styrene. A styrene resin especially suited for the purpose of this invention is a styrene/butadiene copolymer composed of 99 to 66 mole %, particularly 99 to 70 mole %, of styrene and 1 to 40 mole %, particularly 1 to 30 mole %, of butadiene. This styrene/butadiene copolymer is particularly suitable for the present invention since it permits easier treatment of forming an oxidation product layer on its surface than other styrene resins. Of course, by forming the container body from this styrene/butadiene copolymer, the impact strength, particularly at low temperatures, of the container itself can be enhanced. Ordinary polystyrene, and a blend of polystyrene and polybutadiene or a blend of polystyrene and styrene butadiene rubber may also be used although longer periods of time are required for performing a treatment of forming an oxidation product layer on the surface. Needless to say, a blend of polystyrene and the aforeside styrene/butadiene copolymer may be used. Preferably, the styrene resin used has a molecular weight of generally $1 \times 10^4$ to $1 \times 10^6$, particularly $2 \times 10^4$ to $5 \times 10^5$.

Known additives may be incorporated in the styrene resin constituting the container body. Examples of the additives include pigments such as titanium white, yellow iron oxide, red iron oxide, ultramarine blue and iron black, fillers such as calcium carbonate, silica, talc, magnesium hydroxide and aluminum hydroxide, antioxidants, ultraviolet absorbers and lubricants.

The container body may be of any desired shape, for example a seamless cup, a tray, a bottle or a can body. The wall of the container may be substantially unoriented, or may be molecularly oriented monoaxially or biaxially. The wall of the container may be formed of an unfoamed styrene resin, or of a foamed styrene resin, or of a combination of these. Formation of the container body is effected by known methods according to the shape of the container, for example by any desired means such as extrusion molding, injection molding, blow molding, vacuum forming, pressure forming, plug assist molding, biaxial stretch-blow molding and forming-molding using foamable beads.

Figure 2:
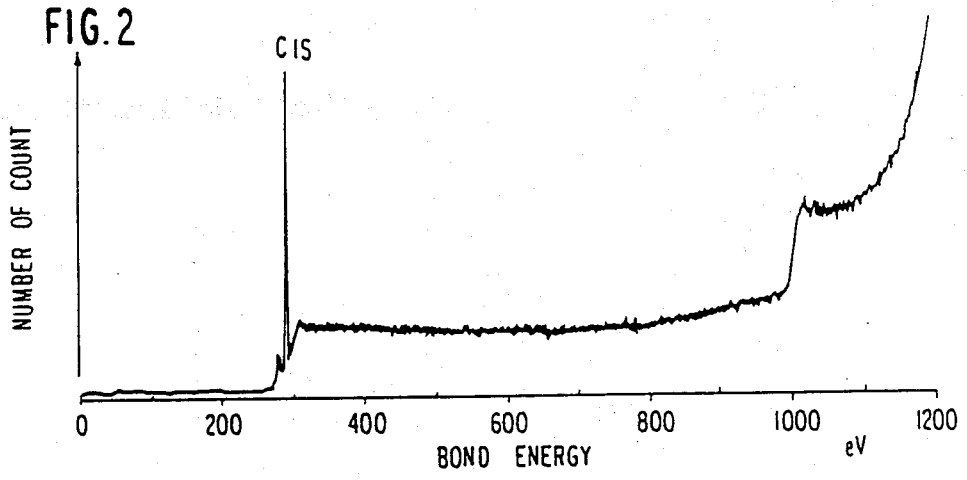
FIG. 2 is an XPS spectrum chart of the surface of the styrene resin container not subjected to an oxidation treatment.
Figure 3:
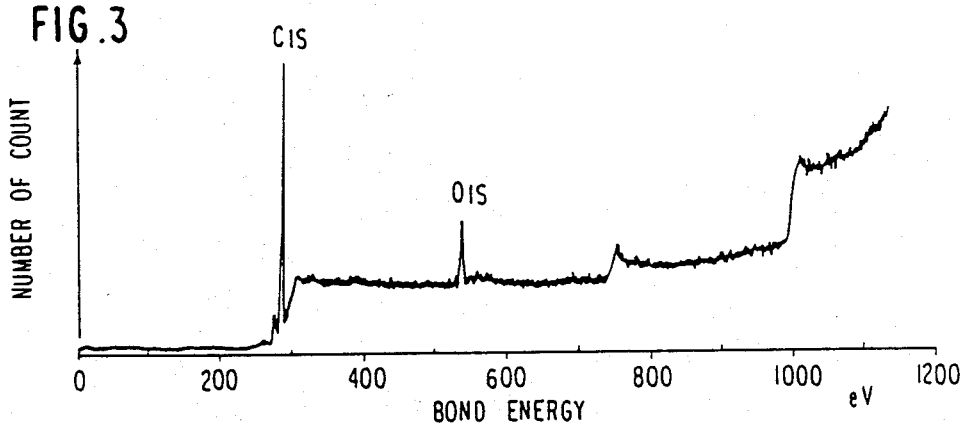
FIG. 3 is an XPS spectrum chart of the surface of the styrene resin subjected to an oxidation treatment.

The oxidation product layer formed on the surface of the styrene resin container results from oxidation of the styrene resin itself. The thickness of the oxidation product layer is as small as 1 to 1000 angstrom (Å). The presence of the oxidation product layer can be determined by X-ray photoelectron spectroscopy (XPS). FIG. 2 of the accompanying drawings is an XPS spectrum chart of the surface of a non-treated styrene resin container, and FIG. 3 is an XPS spectrum chart of the surface of a styrene resin container subjected to an oxidation treatment. By comparison of these spectra, it is seen that only the peak of $C_{IS}$ exists at a position with a bond energy of 285 eV in the non-treated product, whereas in the oxidation product, peaks of $O_{IS}$ exist at a bond energy in the range of 530 to 537 eV in addition to the above peak.

The bond energy at which a peak of $O_{IS}$ appears differs according to the manner of bonding between oxygen and carbon, for example depending upon which of the following bonds this bond corresponds.

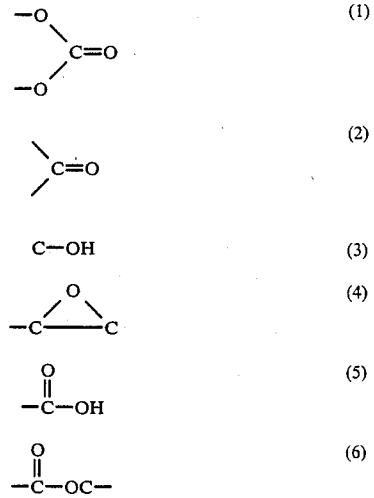

In the present invention, satisfactory results are obtained with regard to the coatability of the latex and the adhesion of the coatin if there is formed an oxidation product layer having peaks of $O_{IS}$ are formed at a bond energy of 532 to 533.7 eV, especially 532.5 to 533.6 eV.

What is to be especially noted is that when the bond energy at which the $O_{IS}$ peak appears exceeds 533.6 eV, the adhesion of the coating rather decreases. This is presumably because the proportion of the bond represented by formula (1) above in the bonds of oxygen and carbon becomes high, and the properties of the oxidation product layer itself are weakened.

The oxidation treatment of the surface of the container body should be carried out such that the area ratio ($R_{O/C}$) of oxygen peaks ($O_{IS}$) to carbon peaks ($C_{IS}$) becomes 0.1 to 0.34, preferably 0.15 to 0.32. If the $R_{O/C}$ is lower than the above-specified limit, the effect of enhancing coatability and adhesion is not sufficient, and if it is higher than the specified limit, the adhesion, particularly peel resistance at low temperatures in the wet state, of the coating is rather reduced.

The oxidation treatment of the container closure is carried out by known means, for example oxidation by contacting the surface of the container with a gas flame, oxidation by contacting it with heated air, oxidation by contacting it with a mixture of sulfuric acid and bichromic acid, oxidation by corona discharge, oxidation by irradiation of ultraviolet light (particularly ultraviolet light of wavelengths shorter than 2000 Å, for example by using light from a low-pressure mercury lamp or an arc lamp) and oxidation by irradiation of radioactive rays.

The vinylidene chloride resin used in this invention has the composition mentioned above. The alkyl acrylate or methacrylate may be, for example, one or a combination of two or more, of methyl acrylate, ethyl acrylate, propyl acrylate, butyl acrylate, methyl methacrylate and ethyl methacrylate. The vinylidene chloride resin is not limited to the terpolymer mentioned above, and it should be understood that it may contain another comonomer component, for example, acrylonitrile, methacrylonitrile, styrene, vinyl acetate, acrylic acid, methacrylic acid, maleic anhydride or fumaric acid, in an amount of up to 20 mole %, especially up to 10 mole %, based on the total amount of the three components.

Advantageously, the latex has a solids concentration of 20 to 65% by weight, especially 35 to 60% by weight. There is no limitation on the emulsifier in the latex, and it may be, for example, an anionic surface-active agent such as sodium dodecylbenzenesulfonate. Furthermore, advantageously, the latex has a surface tension of 35 to 55 dyne/cm, particularly 40 to 50 dyne/cm (20° C.). If the surface tension is lower than the above-specified limit, the emulsifier is contained in a large amount, and the adhesion, particularly adhesion in the wet state, of the coating to the styrene resin is poor. If it is higher than the specified limit, the wetting property of the latex on the styrene resin container body is poor, and coating is liable to become poor.

Coating of the latex is carried out by, for example, a dip coating method, a roll coating method, a spray coating method, an electrostatic coating method or a brush coating method. There is no particular restriction on the coating conditions. The marked characteristic of the invention is that by using the vinylidene chloride resin having the above-mentioned composition, sufficient coating and film-formation are carried out at room temperature. If desired, however, it is also possible to heat the styrene resin container to a temperature of 40° to 60° C. The amount of the latex coated may be such that after drying, the coating has a thickness of 0.5 to 60 μm, particularly 1 to 30 μm.

Then, the wet coating of the vinylidene chloride resin is dried to form a final coating. The drying treatment may be carried out in one or more stages. For example, far-infrared rays are irradiated onto the wet coating to raise its temperature to 60° to 90° C., and then the coating is contacted with hot air at 40° to 100° C. to remove moisture. This two-stage drying method makes it possible to perform drying efficiently within a short period of time.

The coated styrene resin container in accordance with this invention has some characteristic features not seen in conventional ones. Specifically, the coated layer of the vinylidene chloride resin has a relatively low glass transition temperature of 6° to 18° C. and a relatively low dynamic modulus at 10° C. of $2 \times 10^{10}$ to $4 \times 10^{10}$ dyne/cm² while possessing excellent gas-barrier property represented by an oxygen permeation coefficient at 28° C. and 100% RH of not more than $3.0 \times 10^{-13}$ cc.cm/cm².sec.cmHg. These characteristics bring about the advantages that the coated layer does not undergo breakage nor cracking even when handled roughly at low temperatures, and its gas-barrier property with respect to gases such as oxygen is retained. If the glass transition temperature is lower than the specified limit and the dynamic modulus at 10° C. is lower than the specified limit, the coating has inferior scratch resistance.

Furthermore, this coated container has excellent peel resistance, especially at low temperatures in the wet state, and when immersed in water at 5° C. for 1 week, it has a wet peel strength of at least 80 g/18 mm width, particularly at least 100 g/18 mm width. The following examples illustrate the present invention.

EXAMPLES

Evaluation of the peel strength and flexural strength of the coated film and measurement of XPS spectra were carried out by the following methods.

Methods of evaluating the coated film (i) Measurement of the peel strength of the coated film A cup-like container of which outside surface was coated with the vinylidene chloride resin, and the body portion was cut open to prepare a test specimen.

Figure 4:
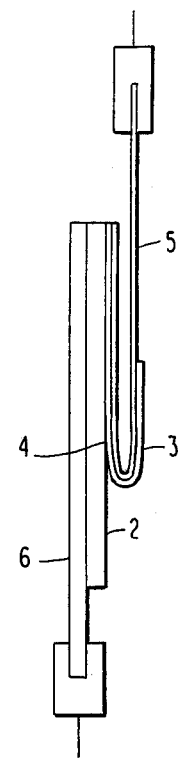
FIG. 4 is a view for explaining a method of testing the film peel strength of a sample.

FIG. 4 illustrate the method of testing the peel strength of the coated film. The reference numerals represent the following.

2: styrene resin container body
3: vinylidene chloride resin coated layer
4: styrene resin oxidation product layer
5: cellophane adhesive tape
6: flat plate The test specimen was fixed to the flat plate, and the cellulose film adhesive tape having a width of 18 mm was bonded to the coated film surface of the test specimen. A cut was formed by a knife on the coated film along the edge of the tape. The end portion of the coated film was peeled in advance by picking as shown in FIG. 4. The test specimen and the cellophane tape were fixed to chucks of a tensile tester. The "180°" peel of the coated film was carried out at a pulling speed of 100 mm/min., and the peel strength was measured.

The peel strength in the wet state was measured by the above method immediately after the coated container immersed in water at 5° C. for one week was taken out from the water.

The peel strength in the dry state was measured by the above method on a container not immersed in water.

(ii) Flexural strength in the wet state

Figure 5A:
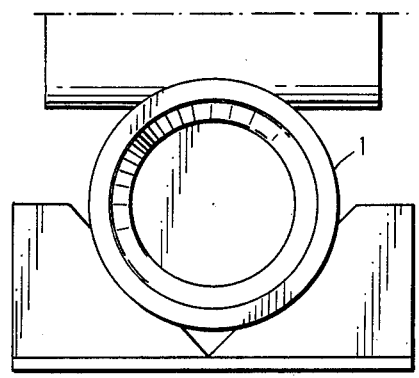
FIGS. 5A and 5B are views for explaining a method of testing the flexural strength of the coated film in a sample.
Figure 5B:
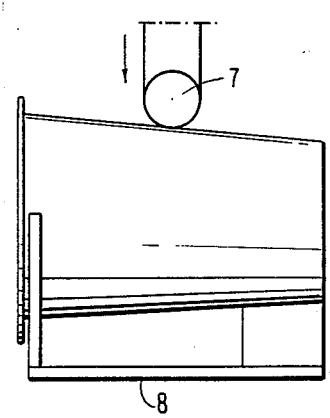

The test was carried out by the method shown in FIGS. 5A and 5B. In FIGS. 5A and 5B, 1 represents a coated styrene resin container; 7 represents a round rod with an R of 4.5 mm; and 8 represents a testing jig. The coated container was immersed in water at 5° C. for 1 week. Immediately after the container was taken out from water, the body portion was pushed inwardly and deformed 10 mm with a round rod having a diameter of 9 mm at a speed of 50 mm/min., and it was determined whether cracking and peeling occurred in the coated film. (Measurement of XPS spectrum)

The XPS spectrum was measured by using a device (ESCA LAB5 mae by VG Company, England) using MgKα rays as an X-ray source.

The bond energy of an $O_{IS}$ electron was determined by taking the bond energy of a $C_{IS}$ electron of a hydrocarbon moiety (CH) as 285 eV.

EXAMPLE 1

The outside surface of a cup-like container (wall thickness 500μ, inner capacity 150 cc) of high-impact polystyrene (Styron H8175 of Asahi Chemical Industry, Co., Ltd.) produced by injection molding was subjected to a corona discharge treatment with the output of a treating device being kept constant. The peak area ratio ($R_{O/C}$) of the peak area of $O_{IS}$ electrons to the peak area of $C_{IS}$ electrons in the XPS spectrum of the treated surface were as shown in Table 1.

A vinylidene chloride resin latex A shown in Table 2 was spray-coated to a dry thickness of 8μ on the cup-like container subjected to corona discharge treatment under the same conditions as above and heat-dried by a far-infrared heater for 1 minute.

COMPARATIVE EXAMPLE 1

Example 1 was repeated except that latex B, C or D in Table 2 was used as the vinylidene chloride latex.

The peel strengths in the dry and wet states and the flexural strengths in the wet state of the coatings of the containers obtained in the above Example and Comparative Example were examined by the methods described in the specification. The results shown in Table 3 were obtained.

TABLE 1

| Corona discharge treatment time (sec) | XPS spectrum peak area ratio ($R_{O/c}$) | Bond energy of $O_{IS}$ peak (eV) |
| --- | --- | --- |
| 0 | 0.00 | — |
| 0.2 | 0.008 | 532.4 |
| 0.5 | 0.24 | 533.5 |
| 0.7 | 0.27 | 533.6 |
| 1.0 | 0.29 | 533.6 |
| 2.0 | 0.35 | 533.8 |
| 4.0 | 0.36 | 534.0 |

TABLE 2

| Latex | Monomer composition (mole %) | | | | Dry film Dynamic modulus (dyne/cm$^2$) (10° C., 110 Hz) | Tg (°C.) |
| --- | --- | --- | --- | --- | --- | --- |
| | Vinylidene chloride | Vinyl chloride | Methyl acrylate | Acrylic acid | | |
| A | 80 | 10 | 10 | — | 3.0 × 10$^{10}$ | 10 |
| B | 95 | — | 5 | — | 5.0 × 10$^{10}$ | 20 |
| C | 85 | 10 | — | 5 | 4.5 × 10$^{10}$ | 19 |
| D | 70 | 30 | — | — | 1.0 × 10$^{10}$ | 2 |

All had a solids content of 48% and a surface tension of 43 dyne/cm (20° C.)

TABLE 3

| Corona discharge treatment (sec) | Type of the latex | Film peel Strength (g/18 mm) | | Wet flexural strength |
| --- | --- | --- | --- | --- |
| | | Dry | Wet | |
| Example | | | | |
| 0 | A | poor coatability | | — |
| 0.2 | A | 90 | 50 | X |
| 0.5 | A | 210 | 170 | O |
| 0.7 | A | 220 | 170 | O |
| 1.0 | A | 200 | 130 | O |
| 2.0 | A | 170 | 70 | Δ |
| 4.0 | A | 90 | 10 | X |
| Comparative Example | | | | |
| 0.5 | B | 30 | 10 | X |
| 0.5 | C | 200 | 30 | X |
| 0.5 | D | 30 | 10 | X |

Remarks
O: Cracking and delamination did not occur at the time of deformation
Δ: Cracking occurred at the time of deformation
X: Cracking and delamination occurred at the time of deformation

We claim:

1. A coated styrene resin container comprising a container body composed of a styrene resin and having applied to at least one surface of the container body, a coated layer of a vinylidene chloride resin, the vinylidene chloride resin coated layer being composed of a copolymer containing 96 to 70 mole % of vinylidene chloride units, 3 to 30 mole % of vinyl chloride units and 3 to 20 mole % of lower alkyl acrylate or methacrylate units based on the three components, and the coated layer being intimately bonded to the container body via a layer of an oxidation product of the styrene resin which has $O_{IS}$ peaks at a bond energy of 532.5 to 533.6 eV when measured by X-ray photoelectron spectroscopy.

2. The container set forth in claim 1 in which the coated layer is intimately bonded to the container body so that when the container is immersed in water at 5° C. for 1 week, it has a wet peel strength of at least 100 g/18 mm width.

3. The container set forth in claim 1 in which the styrene resin is a copolymer containing 99 to 70 mole % of styrene and 1 to 30 mole % of butadiene.

4. The container set forth in claim 1 in which the vinylidene chloride resin coated layer has a glass transition point of 6° to 18° C. and a dynamic modulus of 2×10$^{10}$ to 4×10$^{10}$ dyne/cm$^2$ (10° C., 110 Hz).

5. The container set forth in claim 1, wherein said layer has an area ratio (Ro/c) of oxygen peaks ($O_{IS}$) to carbon peaks ($C_{IS}$) in the range of from 0.1 to 0.34.

6. A process for producing a coated styrene resin container, which comprises subjecting at least one surface of a container body composed of a styrene resin to an oxidation treatment so that the area ratio of oxygen peaks to carbon peaks measured by X-ray photoelectron spectroscopy is in the range of from 0.15 to 0.32 such that the oxidation product of the styrene resin has $O_{IS}$ peaks at a bond energy of 532.5 to 533.6 eV when measured by X-ray photoelectron spectroscopy coating an aqueous latex of a vinylidene chloride resin containing 96 to 70 mole % of vinylidene chloride units, 3 to 30 mole % of vinyl chloride units and 3 to 20% of lower alkyl acrylate or methacrylate units based on the three components on the oxidized surface of the container body, and drying the coated layer so formed.

* * * * *